(12) United States Patent
Luh et al.

(10) Patent No.: US 7,197,915 B2
(45) Date of Patent: Apr. 3, 2007

(54) SYSTEM AND METHOD FOR THE SETTING OF AN ENGINE TORQUE AND A GEARBOX RATIO IN A VEHICLE WITH A CONTINUOUSLY VARIABLE GEARBOX

(75) Inventors: Joachim Luh, Bietigheim-Bissingen (DE); Markus Paeulgen, Esslingen (DE); Frank Seidel, Stuttgart (DE); Karl-Heinz Senger, Loechgau (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 10/466,078

(22) PCT Filed: Nov. 7, 2002

(86) PCT No.: PCT/DE02/04143

§ 371 (c)(1),
(2), (4) Date: May 10, 2004

(87) PCT Pub. No.: WO03/041990

PCT Pub. Date: May 22, 2003

(65) Prior Publication Data

US 2004/0249539 A1 Dec. 9, 2004

(30) Foreign Application Priority Data

Nov. 10, 2001 (DE) ................. 101 55 372

(51) Int. Cl.
*G01L 5/13* (2006.01)

(52) U.S. Cl. .................................... 73/117.3
(58) Field of Classification Search .......... 73/116–120
See application file for complete search history.

(56) References Cited

U.S. PATENT DOCUMENTS 5,470,290 A * 11/1995 Minowa et al. ............. 477/115
6,027,425 A    2/2000 Sakaguchi et al.
6,157,885 A   12/2000 Sakaguchi et al.

FOREIGN PATENT DOCUMENTS

| DE | 198 14 483 | 10/1999 |
|----|------------|---------|
| DE | 100 10 764 | 9/2001 |
| WO | WO 93 00531 | 1/1993 |
| WO | WO 97 25555 | 7/1997 |
| WO | WO 99 34136 | 7/1999 |
| WO | WO 00 38943 | 7/2000 |

* cited by examiner

*Primary Examiner*—Edward Lefkowitz
*Assistant Examiner*—Jermaine Jenkins
(74) *Attorney, Agent, or Firm*—Walter Ottesen

(57) ABSTRACT

The invention relates to a system for inputting a motor torque and a transmission ratio in a vehicle having a continuously variable transmission (3) with means (202) for determining a desired motor torque (205) while considering a signal representing a driver command; means (203) for determining a desired transmission ratio (206) while considering a signal representing a driver command; and, means (201) for determining the signal representing the driver command. The signal, which represents the driver command, is a relative driver accelerative force command (204, 204'). The invention further relates to a method for inputting a motor torque and a transmission ratio in a vehicle.

11 Claims, 14 Drawing Sheets

SYSTEM AND METHOD FOR THE SETTING OF AN ENGINE TORQUE AND A GEARBOX RATIO IN A VEHICLE WITH A CONTINUOUSLY VARIABLE GEARBOX

RELATED APPLICATION

This application is the national stage of PCT/DE 02/04143, filed Nov. 7, 2002, designating the United States and claiming priority from German patent application no. 101 55 372.2, filed Nov. 10, 2001, the entire contents of which are incorporated herein by reference.

FIELD OF THE INVENTION

The invention relates to a system for pregiving an engine torque and a transmission ratio for a vehicle having a continuously variable transmission (CVT) including the following: means for determining a desired engine torque while considering a signal representing a driver command; means for determining a desired transmission ratio while considering a signal representing a driver command; and, means for determining the signal representing the driver command. The invention further relates to a method for pregiving an engine torque and a transmission ratio in a vehicle having a continuously variable transmission with the steps: determining a signal representing a driver command; determining a desired engine torque while considering the signal which represents the driver command; and, determining a desired transmission ratio while considering the signal representing the driver command.

BACKGROUND OF THE INVENTION

Continuously variable transmissions (CVT) include essentially two conical wheel pairs and a belt part designed, for example, as a thrust member belt. One of the conical wheel pairs is connected to a drive, for example, an internal combustion engine, while the other conical wheel pair is connected to an output. The drive conical wheel pair and the output conical wheel pair each generally comprise an axial fixed conical wheel and an axial movable conical wheel in order to adjust the ratio of the CVT transmission and the tension of the belt part. The drive conical wheel pair is also characterized as a drive disc or primary disc. The output conical wheel pair is characterized also as an output disc or secondary disc. The contact force of the axially movable conical wheels against the belt part takes place, in general, by the build up of hydraulic pressure, for example, via a pump. With a suitable selection of the distances or the contacting pressures of the conical wheels, the desired ratio of the CVT transmission and the required tension of the belt part can be adjusted. The pump for the hydraulic drive of the conical wheels can, for example, be driven by the internal combustion engine. For the force transmission from the internal combustion engine to the drive conical wheel pair, for example, a torque converter and a planetary set can be provided with clutches for forward travel and rearward travel.

The pull force, which is generated by the drive wheels of a motor vehicle, is determined by the torque at the transmission output (output torque) or by the transmission output power. The output torque is essentially dependent upon the two variables "transmission ratio" and "motor torque". In a vehicle, which is equipped with a continuously variable transmission, an output torque, which is defined on the basis of the pull force command of the driver, can be practically realized by any desired number of combinations of motor torque and transmission ratio. In order to determine the particular combination of motor torque and transmission ratio suitable in the instantaneous driving situation, it has already been suggested to provide a characteristic field or a computation sequence so that a desired value for the transmission ratio can be determined as a function of the output rpm and the position of the accelerator pedal or of the desired value for the transmission output torque in accordance with pregiven operating strategies. The desired value for the motor torque is then determined in dependence upon the determined transmission ratio.

SUMMARY OF THE INVENTION

The invention is built upon the generic system in that the signal, which represents the driver command, is a relative driver accelerative force command. This relative driver accelerative force command can be referred to the maximum available accelerative force. For example, the scaling of the signal can take place in percent. A relative driver accelerative force command of 100% means that maximum accelerative force is wanted. A relative driver accelerative force command of 0% means that a minimum accelerative force is wanted. Because of the situation that the desired motor torque as well as the desired transmission ratio are determined on the basis of this relative driver accelerative force command, it is possible to realize the desired variables in the context of a central application. It is possible to consider the instantaneous actuating range of the motor in the conversion of the driver accelerative force command into the desired engine torque. In this way, a central structure can be made available via which a fuel reduction is realized via consumption-optimal motor control and transmission control.

It can be provided that the relative driver accelerative force command is a relative driver power command.

In a further embodiment of the invention, it is provided that the relative driver accelerative force command is a relative driver drive torque command.

It is especially preferred that the relative driver accelerative force command is determinable via at least one stored characteristic field. Input quantities in the determination of the relative driver accelerative force command are, for example, the accelerator pedal position and the instantaneous output rpm or the vehicle speed. The relative driver accelerative force command can be determined on the basis of these input quantities via application of a characteristic field. The characteristic field considers any desired operating conditions.

In this context, it is especially of use that several characteristic fields are provided for determining the relative driver accelerative force command and that the characteristic fields can be used in dependence upon a selection lever position. The driver can therefore influence by the selection lever position in which manner the input quantities "accelerator pedal position" and "output rpm" are converted into the relative driver accelerative force command and therefore finally into a desired motor torque and a desired transmission ratio.

Likewise, it can be useful that the relative driver accelerative force command can be determined via computation methods. These computation methods can utilize physical laws, for example, independently or even in combination with stored characteristic fields in order to convert the input quantities into the relative driver accelerative force command.

In this context too, it is especially advantageous that several computation methods are provided for determining the relative driver accelerative force command and that the computation methods are usable in dependence upon a selection lever position. Accordingly, here too, the conversion of the input quantities into the desired values can again be influenced by the driver by the adjustment of the selection lever.

In an especially preferred embodiment of the system of the invention, this system is advantageous in that, to determine the desired motor torque, the following applies: while utilizing the instantaneous speed, the relative driver power command is compared to an output power required for constant speed; while utilizing the motor rpm, the maximum drive power is determined; while using the motor rpm, the minimum output power is determined; while utilizing the input rpm of the transmission and the motor rpm, a reference rpm is determined; while using the required output power for constant speed, the maximum drive power, the reference rpm, the converter amplification and the relative driver power command, a desired motor torque signal for an acceleration is generated; while utilizing the required output power for constant speed, the minimum drive power, the reference rpm, a converter amplification and the relative driver power command, a desired motor torque signal for a deceleration is generated and from the comparison result between relative driver power command and the output power required for constant speed, a decision is made whether the desired torque signal for an acceleration or the desired torque signal for a deceleration is used to determine the desired motor torque. In this way, numerous input quantities can be considered in the determination of the desired motor torque.

Likewise, in the context of the system of the invention, it can be provided that, for determining the desired motor torque, the following applies: while utilizing the instantaneous speed, the relative driver output torque command is compared to an output torque required for constant speed; while utilizing the motor rpm, the maximum output torque is determined; while utilizing the motor rpm, the minimum output torque is determined; while utilizing the input rpm and the output rpm, a torque amplification is determined; while utilizing the required output torque for constant speed, the maximum drive torque, the torque amplification, a converter amplification and the relative driver output torque command, a desired motor torque signal is generated for an acceleration; while utilizing the required output torque for constant speed, the minimum drive torque, the torque amplification, a converter amplification and the relative driver output torque command, a desired motor torque signal for a deceleration is generated; and, from the comparison results between the relative output torque command and output torque, which is required for constant speed, a decision is made as to whether the desired torque signal for an acceleration or the desired torque for a deceleration is used to determine the desired motor torque.

The system of the invention is especially advantageous in that: a steady-state desired rpm is determined for specifying the desired transmission ratio while considering the relative driver accelerative force command and operating conditions; a dynamic desired rpm is determined from the steady-state desired rpm while considering operating conditions; a steady-state desired transmission ratio is determined from the dynamic desired rpm while considering operating conditions; and, the desired transmission ratio is determined from the steady-state desired transmission ratio while considering operating conditions. The following, for example, can be considered as operating conditions: a position of the selection lever or driver-specific identifier numbers. In this way, the desired transmission ratio can be determined in a variable manner. The relative driver accelerative force command is used as a decisive input quantity in accordance with the invention.

In this connection, it can be especially advantageous that, in the determination of the desired transmission ratio, the transmission ratio is limited by determining a desired rpm. Such a transmission ratio limiting can be purposeful when an upshifting or downshifting of the transmission beyond the pregiven limit would be required. In these cases, the transmission is adjusted only up to the transmission ratio limit.

In the context of the system of the invention, it can likewise be realized that the transmission ratio is maintained when changing over from an automatic operation into a manual operation. With the switchover into the manual operation, the so-called tip mode, the transmission ratio is at first retained. That gear is assigned to the transmission ratio which gear lies closest to the shift point during the automatic operation. Only when an upshift or a downshift via actuation of the selection lever takes place, is the transmission ratio changed in correspondence to pregiven characteristic lines. In this way, disturbing forced shifting from one gear into the next is prevented so that the driving comfort is increased.

The system of the invention can be further improved in that the desired transmission ratio is changed continuously in a manual operation when reaching an rpm threshold so that an rpm limit is not exceeded nor is there a drop below this limit.

Likewise, in the system of the invention, it can be provided that, in a manual operation, gear data is adapted to the instantaneously selected transmission ratio.

In the system of the invention, it can be provided in an advantageous manner that the determination of the desired transmission ratio contains at least one administrator object and several supply objects in the sense of an object orientated structure.

Furthermore, in the system of the invention, it is preferably provided that the administrator object inquires of the supply objects as to whether they want to supply data for determining the desired transmission ratio.

Furthermore, in the system of the invention, it is preferably provided that the inquiry of the supplier objects takes place in a prioritized manner.

Furthermore, in the system of the invention, it can be provided in an advantageous manner, that the supplier objects can supply a desired rpm and/or a desired transmission ratio.

Furthermore, in the system of the invention, it can be preferably provided that the supplier objects can supply additional information which indicates how the desired transmission ratio should limit the desired rpm input.

Furthermore, in the system of the invention, it can be preferably provided that the supplier objects can supply additional information for influencing the dynamic of the rpm input.

Furthermore, in the system of the invention, it can be advantageously provided that the information for influencing the dynamic of the rpm input are filter constants.

Furthermore, in the system of the invention, it can be advantageously provided that the information for influencing the dynamic of the rpm input are minimum and/or maximum rpm gradients.

Furthermore, in the system of the invention, it can be advantageously provided that the information for influencing the dynamic of the transmission ratio input are filter constants.

Furthermore, the system can be so improved that the information for influencing the dynamic of the transmission ratio input are minimum and/or maximum ratio gradients.

The invention builds upon the generic method in that the signal, which represents the driver command, is a relative driver accelerative force command. In this way, the advantages of the system of the invention are realized in the method. In the embodiments of the method presented hereinafter, the advantages and special features of the corresponding system configurations are set forth.

In the context of the method of the invention, it can be provided that the relative driver accelerative force command is a relative driver power command.

In a further embodiment of the method of the invention, it is provided that the relative driver accelerative force command is a relative driver drive torque command.

It is especially preferred that the relative driver accelerative force command is determined via at least one stored characteristic field.

In this connection, it is especially useful that several characteristic fields are provided to determine the relative driver accelerative force command and that the characteristic fields are used in dependence upon a selection lever position.

Likewise, it can be useful that the relative driver accelerative force command is determined via computation methods.

Also in this connection, it is especially advantageous that several computation methods are provided for determining the relative driver accelerative force command and that the computation methods are used in dependence upon a selection lever position.

In an especially preferred improvement of the method of the invention, this is advantageous in that: for determining the desired motor torque, the relative driver power command is compared to an output power, which is required for constant speed, while considering the instantaneous speed; the maximum drive power is determined while utilizing the motor rpm; the minimum drive power is determined while utilizing the motor rpm; a reference rpm is determined while utilizing the input rpm of the transmission and the motor rpm; a desired motor torque signal for an acceleration is generated while utilizing the output power required for constant speed, the maximum drive power, the reference rpm, a converter amplification and the relative driver power command; a desired motor torque signal for a deceleration is generated while utilizing the output power required for constant speed, the minimum drive power, the reference rpm, a converter amplification and the relative driver power command and from the comparison result between relative driver power command and output power, which is required for constant speed, a decision is made as to whether the desired torque signal is used for an acceleration or the desired torque signal is used for a deceleration to determine the desired motor torque.

In the context of the method of the invention, it can likewise be provided that: to determine the desired motor torque, the relative driver output torque command is compared to an output torque, which is required for constant speed, while utilizing the instantaneous speed; the maximum drive torque is determined while utilizing the motor rpm; the minimum output torque is determined while utilizing the motor rpm; the torque amplification is determined while utilizing the input rpm and the output rpm; a desired motor torque signal for an acceleration is generated while utilizing the output torque required for constant speed, the maximum drive torque, the torque amplification, a converter amplification and the relative drive output torque command; a desired motor torque signal for a deceleration is generated while utilizing the output torque required for constant speed, the minimum drive torque, the torque amplification, a converter amplification and the relative driver output torque command, and from the comparison result between relative driver output torque command and output torque, which is required for constant speed, a decision is made as to whether the desired torque signal for an acceleration or the desired torque signal for a deceleration is used to determine the desired motor torque.

The method of the invention is improved in an especially advantageous manner in that: a steady-state desired rpm is determined for determining the desired transmission ratio while considering relative driver accelerative force command and operating conditions; a dynamic desired rpm is determined from the steady-state desired rpm while considering operating conditions; a steady-state desired transmission ratio is determined from the dynamic desired rpm while considering operating conditions; and, the desired transmission ratio is determined from the steady-state desired transmission ratio while considering operating conditions.

In this connection, it can be shown to be especially advantageous that the transmission ratio is limited in the determination of the desired transmission ratio by determining a desired rpm.

Likewise, in the context of the method of the invention, it can be realized that the ratio is retained when switching over from an automatic operation into a manual operation.

The method of the invention can be improved in that the desired transmission ratio is continuously changed in a manual operation when reaching an rpm threshold so that an rpm limit is not exceeded or there is no drop below this limit.

Likewise, in the method of the invention, it can be provided that, in manual operation, gear information is adapted to the instantaneously selected transmission ratio.

In the method of the invention, it can be preferably provided that the determination of the desired transmission ratio includes at least one administrator object and several supplier objects in the sense of an object-orientated structure.

Furthermore, it can be preferably provided in the method of the invention that the administrator object inquires of the supplier objects as to whether they want to supply information for determining the desired transmission ratio.

Furthermore, in the method of the invention, it can be provided in an advantageous manner that the inquiry of the supplier objects takes place in a prioritized manner.

Furthermore, in the method of the invention, it can be preferably provided that the supplier objects can supply a desired rpm and/or a desired transmission ratio.

Furthermore, in the method of the invention, it can be preferably provided that the supplier objects can supply further information which indicates how the desired transmission ratio should limit the desired rpm input.

Furthermore, it can be provided in an advantageous manner in the method of the invention that the supplier objects can supply additional information for influencing the dynamic of the rpm input.

Furthermore, in the method of the invention, it can be provided in advantageous manner that the information influencing the dynamic of the rpm input are filter constants.

Furthermore, in the method of the invention, it can be provided in advantageous manner that the information for influencing the dynamic of the rpm input are minimum and/or maximum rpm gradients.

Furthermore, it can be provided in advantageous manner in the method of the invention that the data for influencing the dynamic of the transmission ratio input are filter constants.

Furthermore, it can be provided in advantageous manner in the method of the invention that the information for influencing the dynamic of the transmission ratio input are minimum and/or maximum transmission ratio gradients.

The invention is based on the recognition that it is possible to determine the desired motor torque and the desired transmission ratio on the basis of a relative driver accelerative force command in the form of a central application. It is possible to consider the instantaneous actuating range of the motor when converting the relative accelerative force command into the desired engine torque. Finally, the fuel consumption can be reduced in that a consumption-optimized motor control and transmission control are present. The invention can be realized by utilizing a flexible software structure for realizing ratio-based and rpm-based drive functions. In preferred embodiments, a manual shifting of the transmission in the so-called tip mode can take place from one gear into the next gear without disturbing forced shifting. The invention can be implemented while further utilizing existing drive program structures for a drive train management by selecting a percentage of the driver accelerative force command. Furthermore, it is provided in advantageous embodiments that jumps in the desired transmission ratio input can be avoided by computing a filtered reference rpm. The avoidance of unwanted dynamic effects during the conversion of the desired rpm into the desired transmission ratio can take place via the selection of filter parameters which are adapted to the driving situation, for example, acceleration or deceleration.

BRIEF DESCRIPTION OF THE DRAWING

The invention will now be explained with reference to the drawings wherein.

DESCRIPTION OF THE PREFERRED EMBODIMENTS OF THE INVENTION

Figure 1:
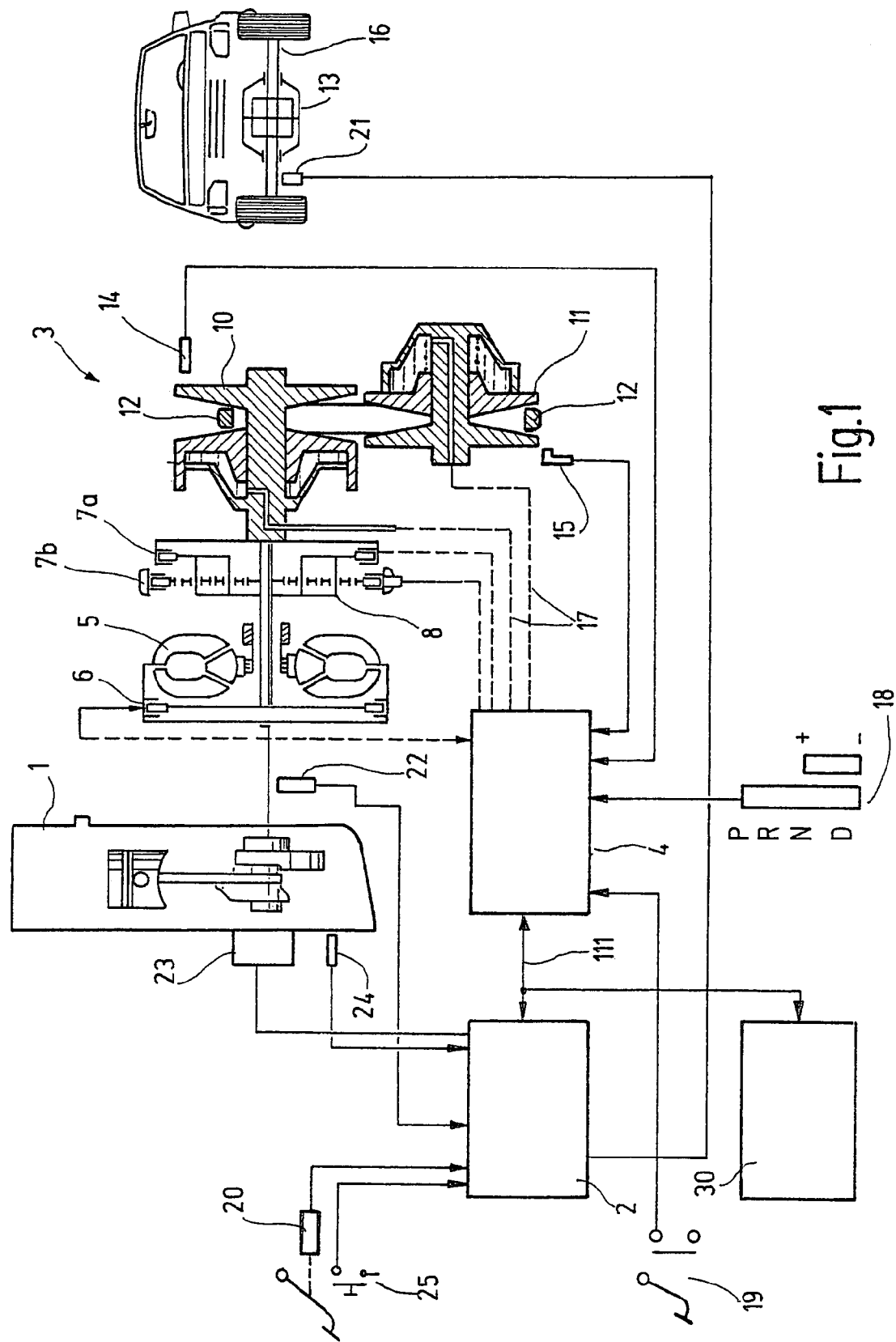
FIG. 1 shows an overview of an arrangement in whose context the present invention can be realized.

FIG. 1 shows an overview of an arrangement in whose context the present invention can be realized. The continuous transmission 3 is coupled to an internal combustion engine 1. The internal combustion engine 1 is controlled by actuating members 23. These actuating members can, for example, be an electronic throttle flap adjusting device, injection valves or an electronic ignition device.

The engine control 2 detects the operating state of the internal combustion engine by means of sensors, at least an engine rpm sensor 22, an output rpm sensor 21 and an engine temperature sensor 24, and adjusts a desired engine torque by driving the actuating member 23. An accelerator pedal sensor 20 detects the position of the accelerator pedal. A kickdown sensor 25 detects the information that the accelerator pedal is completely depressed.

The transmission 3 comprises the known components: optional converter 5 having bridging clutch 6; planetary set 8 having forward clutch 7a and rearward clutch 7b; the primary disc 10; the secondary disc 11; a thrust member belt 12; and, a downstream-connected compensating transmission 13. The transmission is coupled to the drive shaft 16.

The electronic transmission control 4 is, for example, equipped with the following: a sensor 14 for measuring the primary rpm; a sensor 15 for measuring the secondary rpm; a sensor 18 for detecting a selection lever position (P, R, N, D, manual, +, −); and, a sensor 19 for detecting whether the brake pedal is pressed. Alternatively, other sensors can be present with which the ratio of the variator is measured instead of deriving the ratio from the primary rpm and the secondary rpm. Here, the sensors can, for example, be a sensor for measuring the axial displacement of the primary movable conical disc.

The electronic transmission control 4 includes means 17 for adjusting a desired ratio of the variator.

The engine and transmission control (2, 4) are networked via a CAN-bus 111. Sensor signals and additional signals can be exchanged between the engine control 2 and/or the transmission control 4 via the CAN-bus 111.

The sensor signals can possibly be detected by other electronic apparatus (not shown) and can be transmitted via the CAN-bus to the engine control and transmission control.

A further control apparatus 30 (for example, ABS, ASR, ESP) can be provided which exchanges signals via CAN with the engine control and the transmission control, for example, a road speed signal, a transverse acceleration signal, a longitudinal acceleration signal and status signals which indicate that the functions ABS, ASR or ESP are active.

Figure 2:
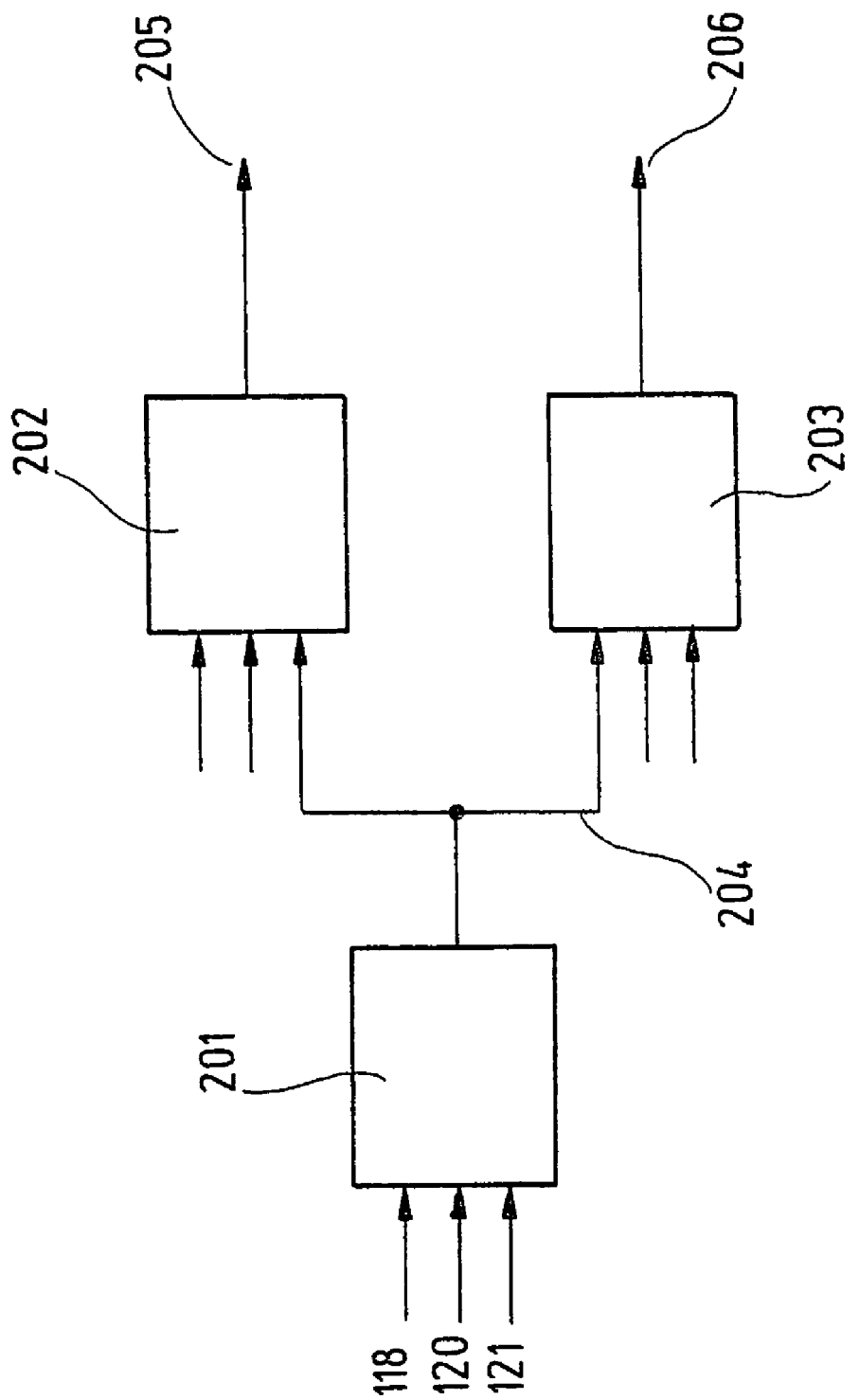
FIG. 2 shows a block diagram for explaining a basic structure of the invention.

FIG. 2 shows a block diagram for explaining the basic structure of the invention. A function block 201 contains an evaluation of the driver power command. For this purpose, a relative driver power command 204 is formed by means of a characteristic field or computation blocks from the accelerator pedal position 120 and the output rpm (or the road speed) 121. The driver power command 204 considers the selection lever position 118. Separate computation methods for forming the relative driver power command 204 are provided for individual selection lever positions, for example, the position "rearwards" or all selection lever positions.

The relative power command is referred to the maximum available output power. The scaling of the signal 204 can take place, for example, in percent. 100% means maximum output power; 0% means minimum output power.

When utilizing a cruise control system, the signal "relative driver command power" can also be made available directly from the cruise control system.

Block 202 includes a computation algorithm for forming a desired engine torque 205 from the relative driver power command 204.

Block 203 contains a computation algorithm for forming a desired transmission ratio 206 from the relative driver power command 204.

The block 203 is implemented, as a rule, in the transmission control apparatus. The blocks 201 and 202 are implemented, as a rule, in the engine control apparatus.

Figure 3:
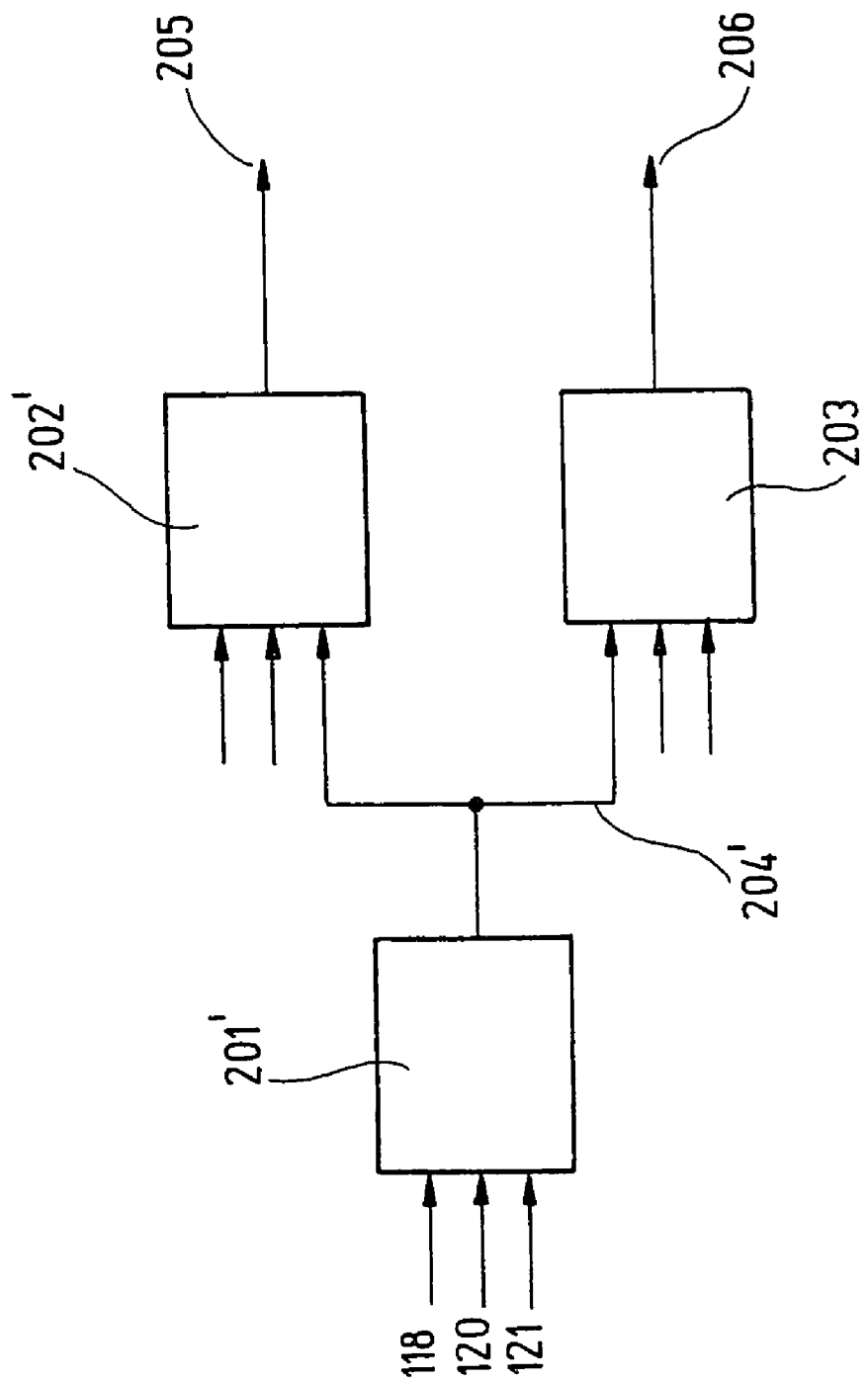
FIG. 3 shows a block diagram for explaining a further basic structure of the invention.

FIG. 3 shows a block diagram for explaining a further basic structure of the invention. In lieu of a relative driver power command 204, a relative driver output torque command 204' can be made available from the function block 201'. The relative driver output torque command 204' is referred to the maximum available output torque. In this case, the block 202' must be configured differently. The block 203 is not touched by this change.

Figure 4:
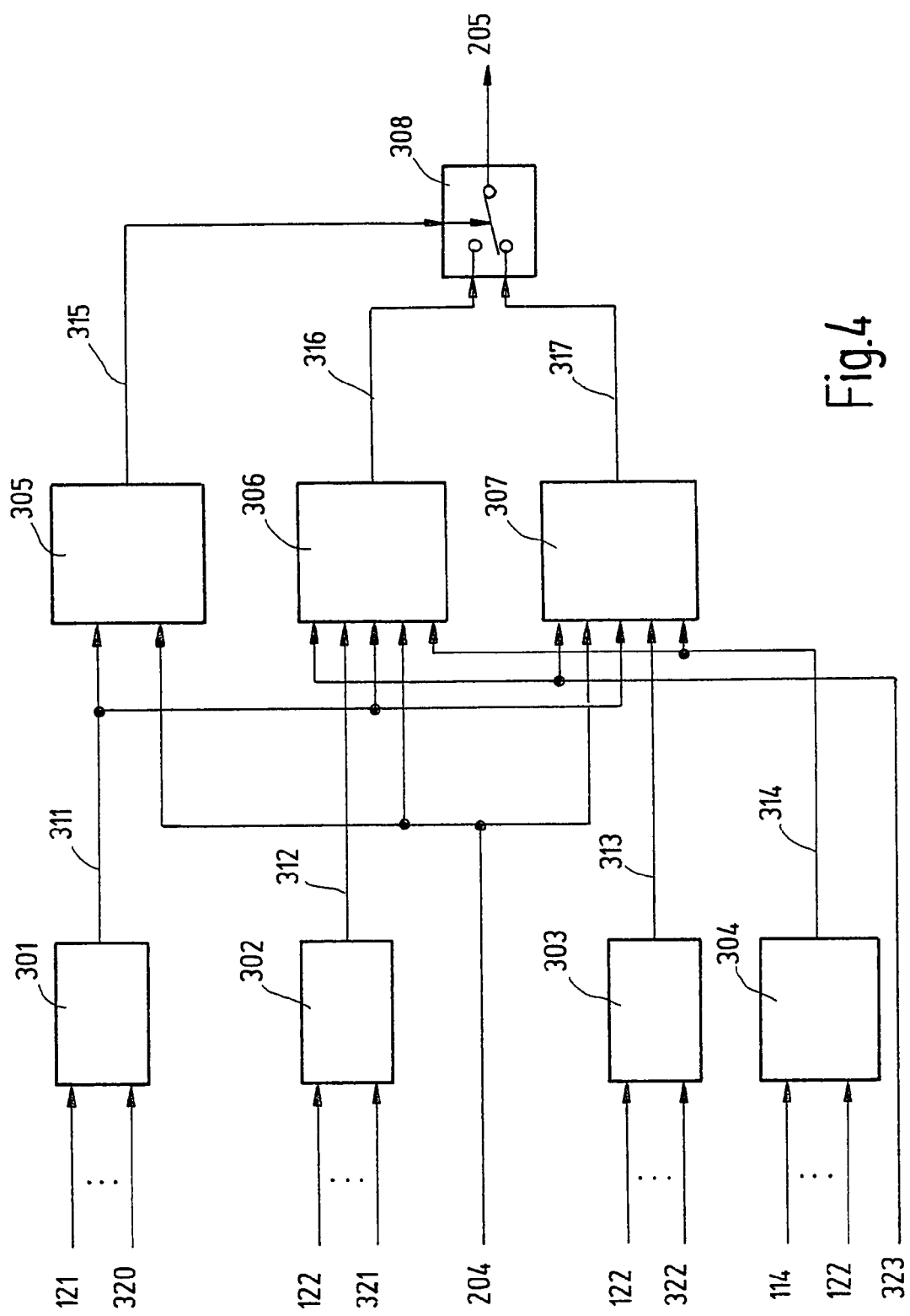
FIG. 4 shows a block diagram for explaining a computation sequence for forming a desired motor torque.

FIG. 4 shows a block diagram for explaining a computation sequence for forming a desired engine torque. The block 301 computes a required output power 311 at which the vehicle travels at constant speed. For this purpose, at least the output rpm or vehicle speed 121 is utilized. However, also other quantities 320 can be used, for example, quantities as to the transmission degree of efficiency, the slope or the loading of the vehicle.

Block 302 computes a maximum available drive power 312 which the drive of the vehicle makes available. With this computation, for example, the engine rpm 122 and additional signals 321 can be used, for example, additional signals as to the available engine operating states.

Block 303 computes a minimum available drive power 313 which the drive of the vehicle makes possible. The engine rpm 122 and additional signals 322 are included in this computation with these additional signals characterizing operating states of the engine, for example, a signal as to whether a shut-off of injection in overrun operation is permitted.

Block 304 computes a reference rpm 314 from the input rpm of the transmission 114 and/or the engine rpm 122. When a torque converter is used, the reference rpm 314 is essentially equal to the turbine rpm of the converter. The reference rpm 314 is limited to a minimum rpm limit.

Block 305 contains a logic for deciding as to whether the relative power command 204 is so large that the vehicle should be essentially accelerated (in the following, referred to as acceleration operation) or should be essentially decelerated (in the following, referred to as deceleration operation). For this purpose, the relative power command 204 is compared to the constant driving power 311. If the power command 204 is greater than the constant driving power 311, then the driver essentially wants to accelerate the vehicle. Otherwise, the vehicle speed should be essentially reduced. The signal 315 is supplied as the result.

Block 306 computes a desired engine torque signal 316 for the operating mode "acceleration operation". For this purpose, the block 306 contains a computation block with which, as a function of the relative power command 204, there is an interpolation between the constant driving power 311 and the maximum available drive power 312. The result of the interpolation is divided by the reference rpm 314 and the converter amplification 323. The result is the signal 316. The converter amplification 323 can, for example, be computed from the rpm signals 122 and 114.

Block 307 computes a desired engine torque signal 317 for the operating mode "deceleration operation". For this purpose, the block 307 includes a computation block with which, as a function of the relative power command 204, there is an interpolation between the minimum drive power 313 and the constant driving power 311. The result of the interpolation is divided by the reference rpm 314 and the converter amplification 323. The result is the signal 317.

With the signal 315, the switching block 308 switches between the output signals 316 and 317 of the blocks 306 and 307 and supplies the desired engine torque 205 as the result.

Figure 5:
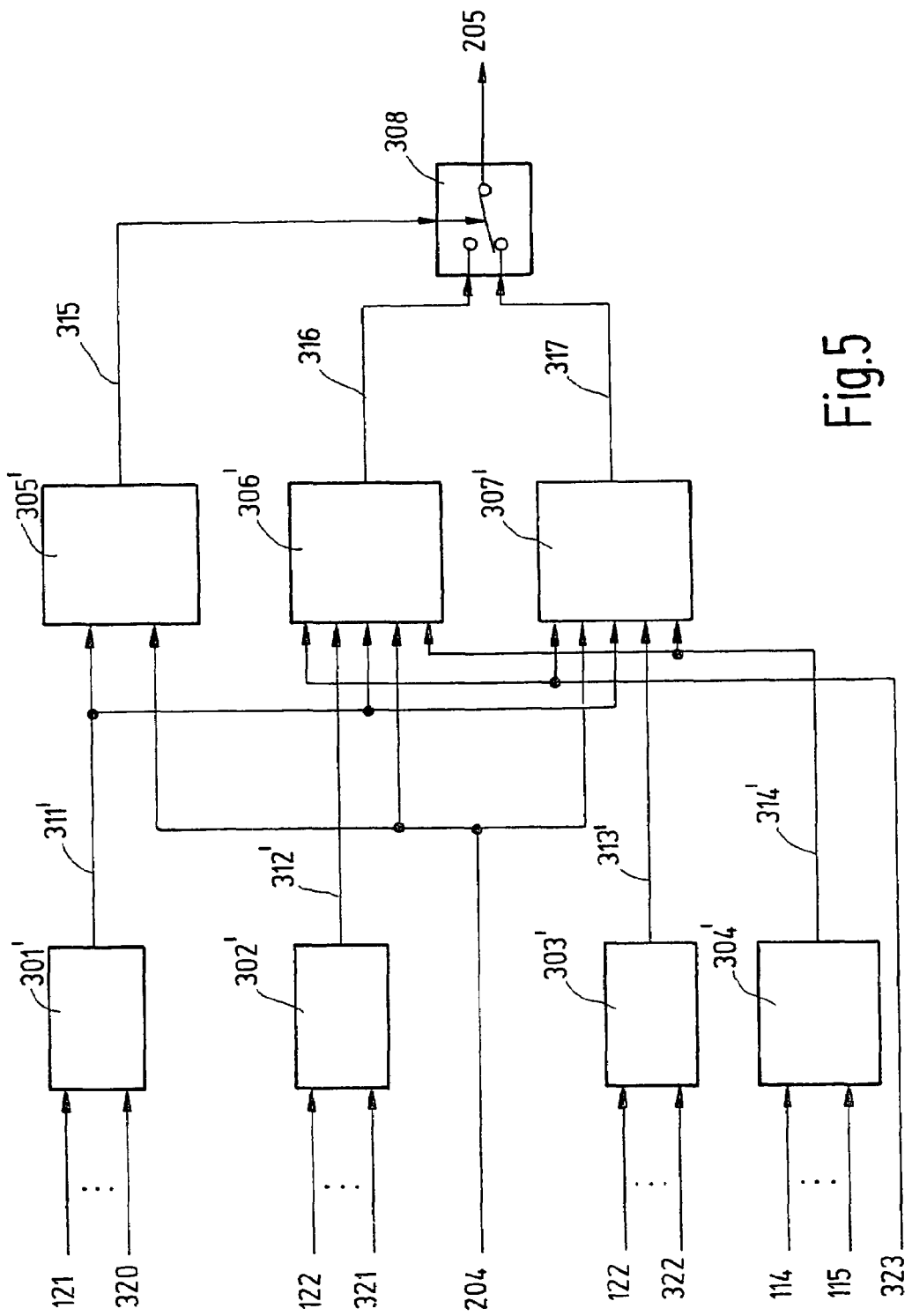
FIG. 5 shows a block diagram for explaining a further computation sequence for forming a desired motor torque.

FIG. 5 shows a block diagram for explaining a further computation sequence for forming a desired engine torque. An algorithm is shown for computing the desired engine torque 205 from the relative driver output torque command 204'.

Block 301' computes a required output torque 311' at which the vehicle travels at constant speed. For this purpose, at least the output rpm or vehicle speed 121 is used. However, additional variables 320 can be used, for example, variables as to the degree of efficiency of the transmission, the slope or the loading of the vehicle.

Block 302' computes a maximum available output torque 312' which makes available the drive of the vehicle. For this computation, for example, the engine rpm 122 and additional signals 321 can be used. These additional signals 321 are signals, for example, as to the available engine operating states.

Block 303' computes a minimum available output torque 313' which makes possible the drive of the vehicle. The engine rpm 122 and additional signals 322 go into this computation. These additional signals characterize operating states of the engine. These signals can, for example, be signals which indicate whether a shut-off of the injection is permitted during overrun operation.

Block 304' computes a torque amplification 314' of the transmission, for example, by evaluating the input rpm 114 and the secondary rpm (output rpm) 115.

Block 305' contains a logic for deciding as to whether the relative output torque command 204' is so great that the vehicle essentially should accelerate (referred to in the following as acceleration operation) or should be essentially decelerated (in the following, referred to as deceleration operation). For this purpose, the relative output torque command 204' is compared to the constant driving output torque 311'. If the output torque command is greater than the constant driving output torque, then the driver essentially wants to accelerate the vehicle. Otherwise, the vehicle speed should essentially be reduced. The signal 315 is supplied as the result.

Block 306' computes a desired engine torque signal 316 for the operating mode "acceleration operation". For this purpose, block 306' contains a computation block with which, as a function of the relative output torque command 204', an interpolation is made between the constant driving output torque 311' and the maximum available torque 312'. The result of the interpolation is divided by the torque amplification 314' and the converter amplification 323. The result is the signal 316.

The converter amplification 323 can, for example, be computed from the rpm signals 122 and 114.

Block 307' computes a desired engine torque signal 317 for the operating mode "deceleration operation". For this purpose, block 307' contains a computation block with which, as a function of the relative output torque command 204', an interpolation is made between the minimum output torque 313' and the constant driving torque 311'. The result of the interpolation is divided by the torque amplification 314' and the converter amplification 323. The result is the signal 317.

With the signal 315, the switching block 308 switches over between the output signals 316 and 317 of the blocks 306 and 307 and supplies the desired engine torque 205 as the result.

Figure 6:
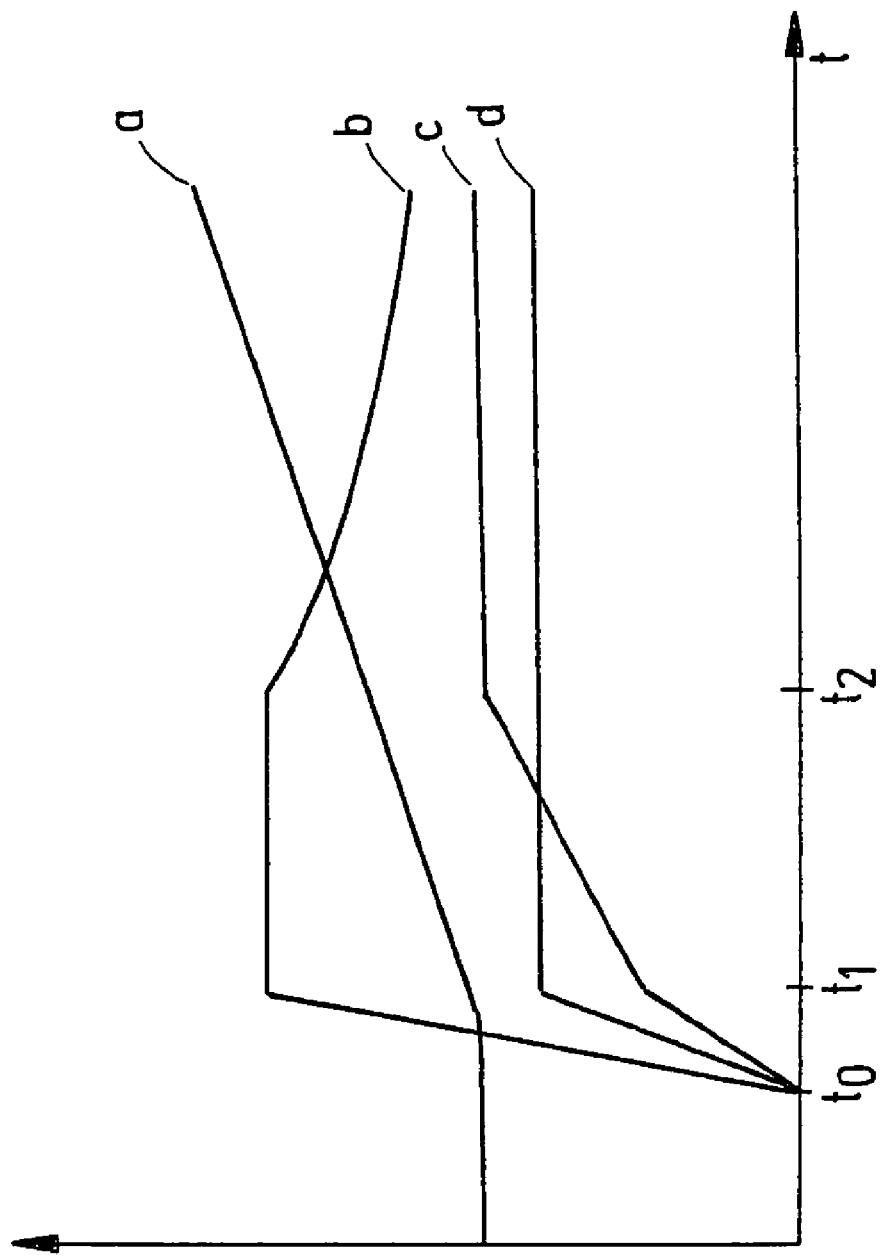
FIG. 6 shows a diagram with different signal courses as a function of time.

FIG. 6 shows a diagram having different signal traces as a function of time. Signals of a start-drive operation with slight to medium accelerator pedal positions are shown which promise an advantageous start-drive performance. This signal behavior can be realized with the computation method explained in connection with FIG. 4.

The curve (a) is for the engine rpm and the curve (b) is for the engine torque and the curve (c) is for the output power and the curve (d) is for the accelerator pedal position.

The driver completely depresses the accelerator pedal from time point t0 to time point t1. Thereafter, the driver continues to drive with a constant accelerator pedal. The engine torque becomes greater up to time point t1. The engine torque remains essentially constant from time point t1 to time point t2. With the increase of the engine rpm, the drive power, however, increases and therefore the output power increases per force essentially proportionally to the engine rpm. Starting from time point t2, the output power has reached the value which corresponds to the relative power command of the driver. Now, the desired engine torque is reduced with increasing engine rpm so that the wanted output power is not exceeded. FIG. 6 shows that with the start-to-move of the vehicle, it is advantageous to increase the wanted engine torque proportionally to the power command until the desired output power is reached.

Figure 7:
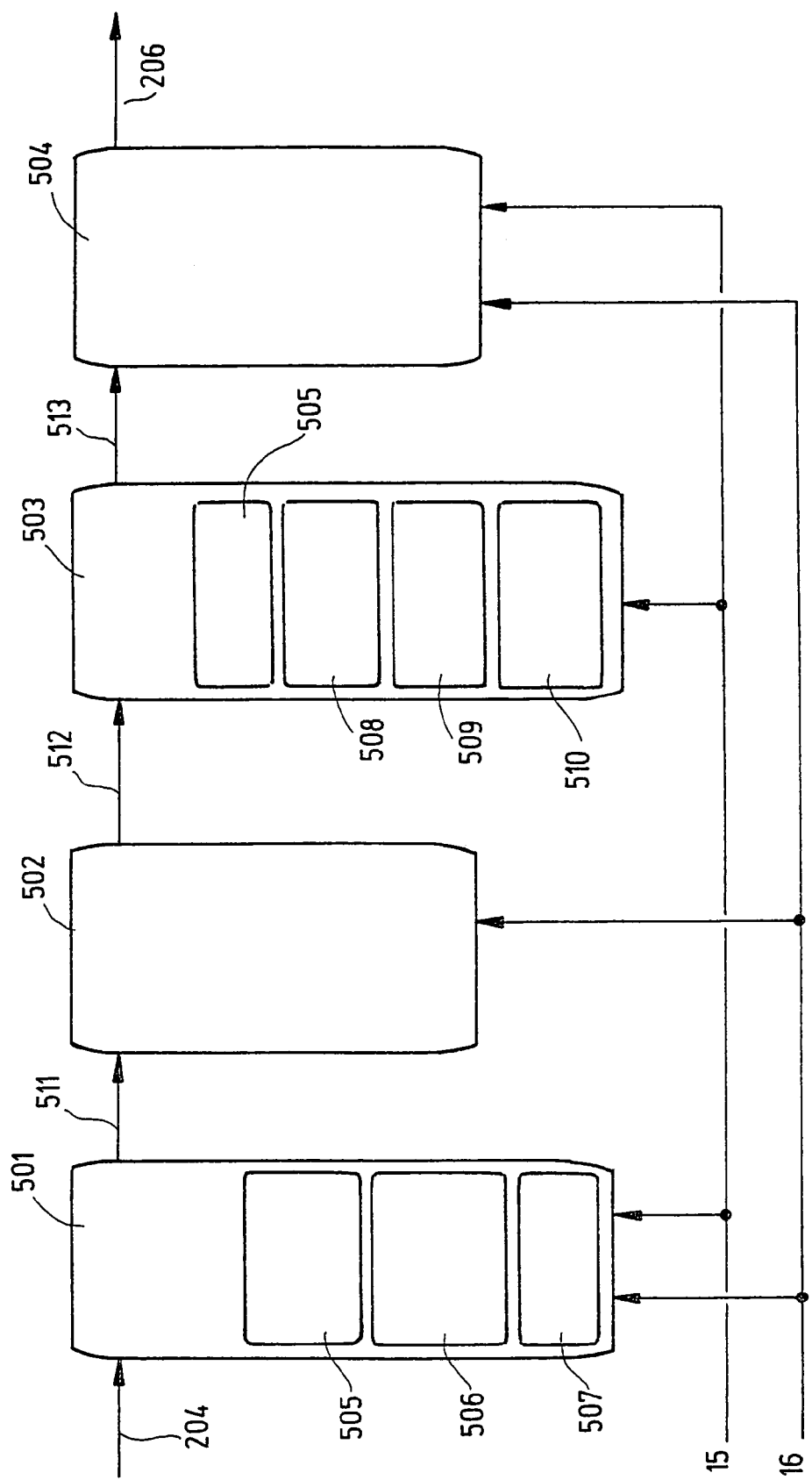
FIG. 7 shows a block diagram for explaining the computation of a desired transmission ratio.

FIG. 7 shows a block diagram for explaining the computation of a desired ratio. The computation block 501 supplies a desired rpm signal 511 which is characterized as a steady-state desired rpm. The block 502 contains computation rules for dynamically influencing the desired rpm signal 512. The rpm signals 511 and 512 are essentially equal in steady state. The block 503 contains a computation block for making available a steady-state desired ratio 513. The block 504 contains computation rules for dynamically influencing the desired ratio 206.

As is known from the state of the art, one/several identifier(s) 516 are determined for evaluating the driver type with a driver type identifier (not shown). A status signal 515 supplies a statement as to the driving situation. Behind this, there is included, for example, the identifier as to whether driving is forward/rearward or whether there is downhill driving, et cetera.

What is essential to making available the desired ratio is that there are operating conditions in which it is advantageous to input a desired ratio and that there are operating conditions wherein it is advantageous to input a desired rpm. Accordingly, it is preferable to input a constant ratio for rearward travel 508, for almost-off 510 and in the manual tip mode 509. In contrast, it is, on the other hand, preferred to input a desired rpm for normal forward travel 505, for warm up and for the protective function "overheat" 506. Furthermore, it can be advantageous to input a desired rpm for downhill travel 507.

Supplier objects can be assigned to the different operating conditions (rearward, manual . . . ) in the sense of an object-orientated software configuration. These supplier objects are requested to supply the following by an administrator software: desired rpms, desired ratios and parameters for influencing the dynamic in blocks 502 and 504. The administrator evaluates the fed-back quantities and initiates the computation of the signals 511, 512, 513 and 206. With this structure, the supplier objects can be flexibly adapted to the desired functionalities.

For an input of a desired rpm 512, the block 503 converts this desired rpm into a desired transmission ratio when utilizing the output reference rpm $n_{ab, ref}$:

$$i = \frac{n_{des,512}}{n_{ab,ref}} \quad (1)$$

or it converts the desired rpm 512 into a desired variator ratio when utilizing the secondary reference rpm $n_{sec, ref}$:

$$i = \frac{n_{des,512}}{n_{sec,ref}} \quad (2)$$

For an operating situation (economy/sport), it can be advantageous that, in addition to the rpm, a ratio is inputted in the sense of a ratio limit. This ratio limit becomes only effective when the ratio computation from the signal 512 yields that an upshift or downshift of the transmission beyond this limit would be required. In these cases, the transmission is shifted only up to this ratio limit. In all other cases, the ratio is, however, not shifted in the direction of the ratio limit without the ratio computation from the rpm 512 requiring this.

The determination of the reference rpms is described in connection with FIG. 10.

Block 502 contains a storage element for storing the desired rpm 512. A filter block is assigned to this storage element. The filter realizes a gradient limiting and a lowpass filtering of the first or second order. The parameters of the filter are made available by the supplier objects. It is distinguished whether the desired rpm increases or drops. The parameter selection of the supplier objects is dependent upon the determined driver type 516 and the vehicle speed/ output rpm 121.

Block 504 contains a storage element for storing the desired ratio 206. This storage element is assigned to a filter block. The filter realizes a gradient limiting and a lowpass filtering of the first or second order. The parameters of the filter are made available by the supplier objects. Here, it is distinguished whether the desired ratio increases or drops. The parameter selection of the supplier objects is dependent upon the determined driver type 516.

In a further configuration, it can be advantageous to store the gradient limiting in the control apparatus in the form of a desired rpm change and to then convert the same, with the aid of the output reference rpm (if transmission ratio) or secondary reference rpm (if variator ratio), into a transmission ratio gradient:

$$\left(\frac{di}{dt}\right)_{max} = \frac{\left(\frac{dn}{dt}\right)_{max}}{n_{ab,ref}} \quad (3)$$

The storage element in block 502 must, with the input of a desired ratio by the supplier object, be adapted to the instantaneous desired ratio 206. For this purpose, a back computation takes place via a rearrangement of the equation (1) or (2). The result of the back computation is stored in the storage element of block 502.

When recognizing the situation "rearward travel", it is advantageous to input a constant ratio.

When recognizing the situation "almost-off", it is advantageous to store the instantaneous ratio and to use the same as a desired ratio input.

Figure 9:
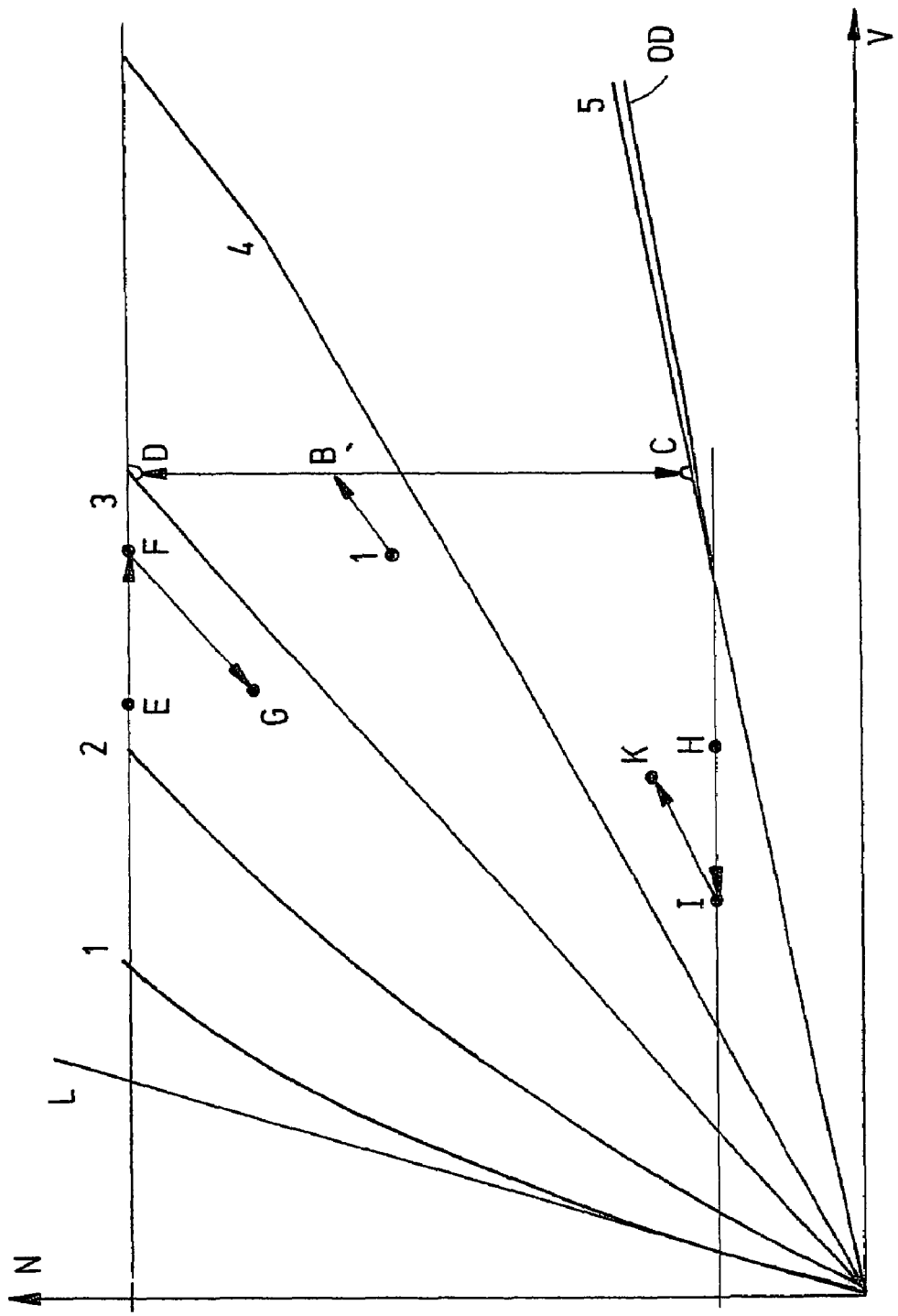
FIG. 9 shows a diagram (variogram) with possible transmission ratio traces with an rpm being plotted against the vehicle speed.

When recognizing the situation "manual tip mode", it is advantageous to input a desired ratio (see FIG. 9).

Figure 8:
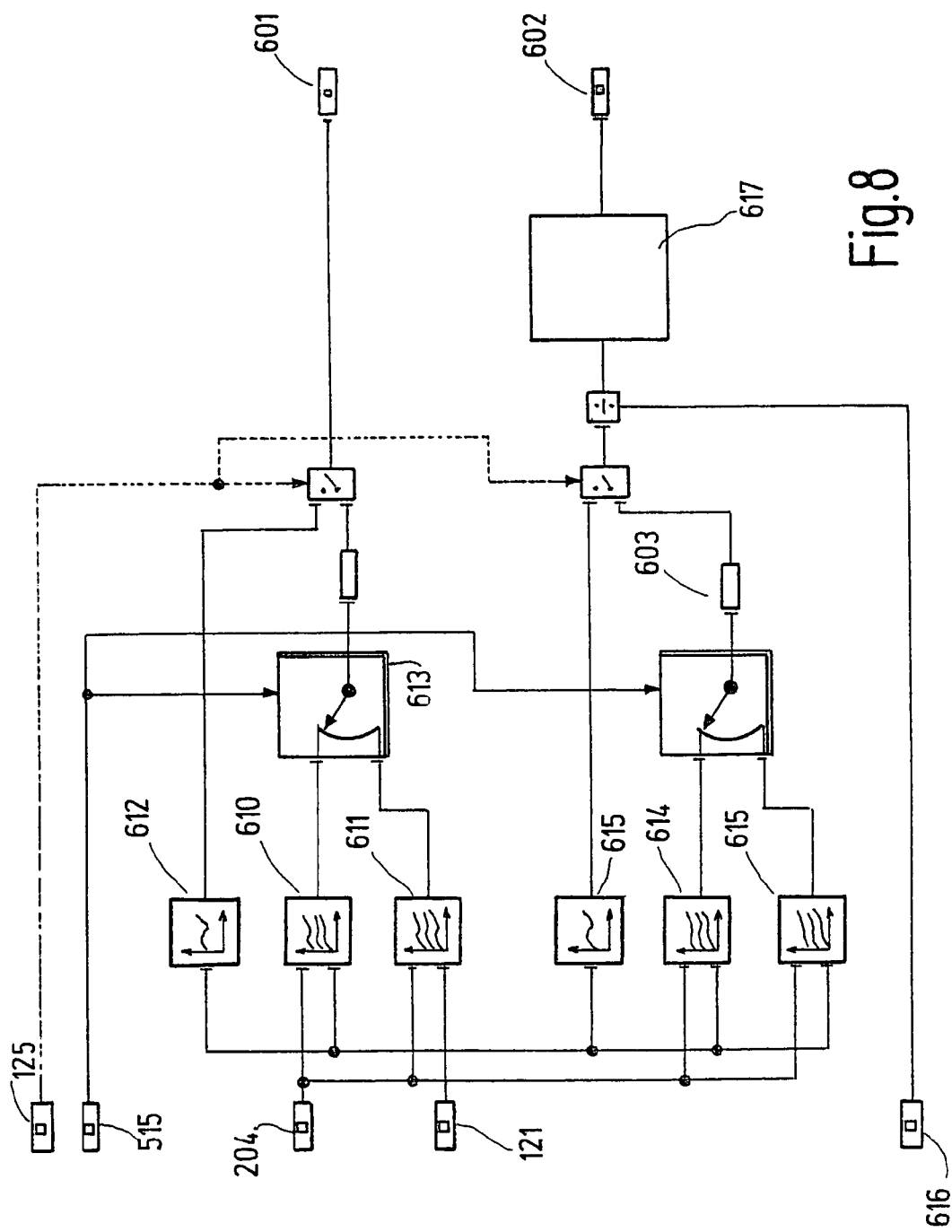
FIG. 8 shows a block diagram for determining a desired rpm in dependence upon specific operating conditions.

FIG. 8 shows a block diagram for determining a desired rpm in dependence upon specific operating conditions. In lieu of the accelerator pedal/throttle flap position, the relative power command for the rpm determination is used in the economy (sport) mode. With the signal "driver type", an interpolation is made in block 613 between the results from a characteristic field block 610 for economy and a characteristic field block 611 for sport. The type of driver is scaled as a value between 0 and 100%.

A ratio limiting is suggested in addition to the input of a desired rpm 601. The ratio limit 602 can, in turn, be determined from two rpm characteristic fields for economy 614 and sport 615. This rpm 603 is converted into a ratio 602 by means of the equation (1).

In the case that the driver activates the kickdown switch by fully depressing the accelerator pedal, different characteristic lines are activated than in the purely economy/sport mode, namely, the lines 612 and 615.

FIG. 9 shows a diagram (variogram) with possible ratio courses. An rpm is plotted against the vehicle speed. In addition, a lower limit L (low) as well as an upper limit OD (overdrive) are shown.

Five gears are shown. If the driver switches at point A into the manual operation, then the ratio is at first retained and the ratio of that gear is assigned which is closest to point A. In the illustrated case, this is the fourth gear. The driver drives, for example, up to point B without further manual intervention. Only when the driver triggers an upshift or downshift by actuating the selection lever toward "+" or "−", is the ratio changed in accordance with the characteristic line C or D. Furthermore, the case can occur that with acceleration of the vehicle or with deceleration of the vehicle, an rpm upper limit Nmax is exceeded or there is a drop below the lower limit Nmin. In this case, the transmission triggers a forced upshift (E-F) or a forced downshift (H-I). However, shifting is not in whole gear stages. Rather, the ratio is changed continuously and always assigned to the next-lying gear. If the driver decelerates the vehicle or accelerates the vehicle anew, then the intermediate ratio is maintained (point G and point K).

Figure 10:
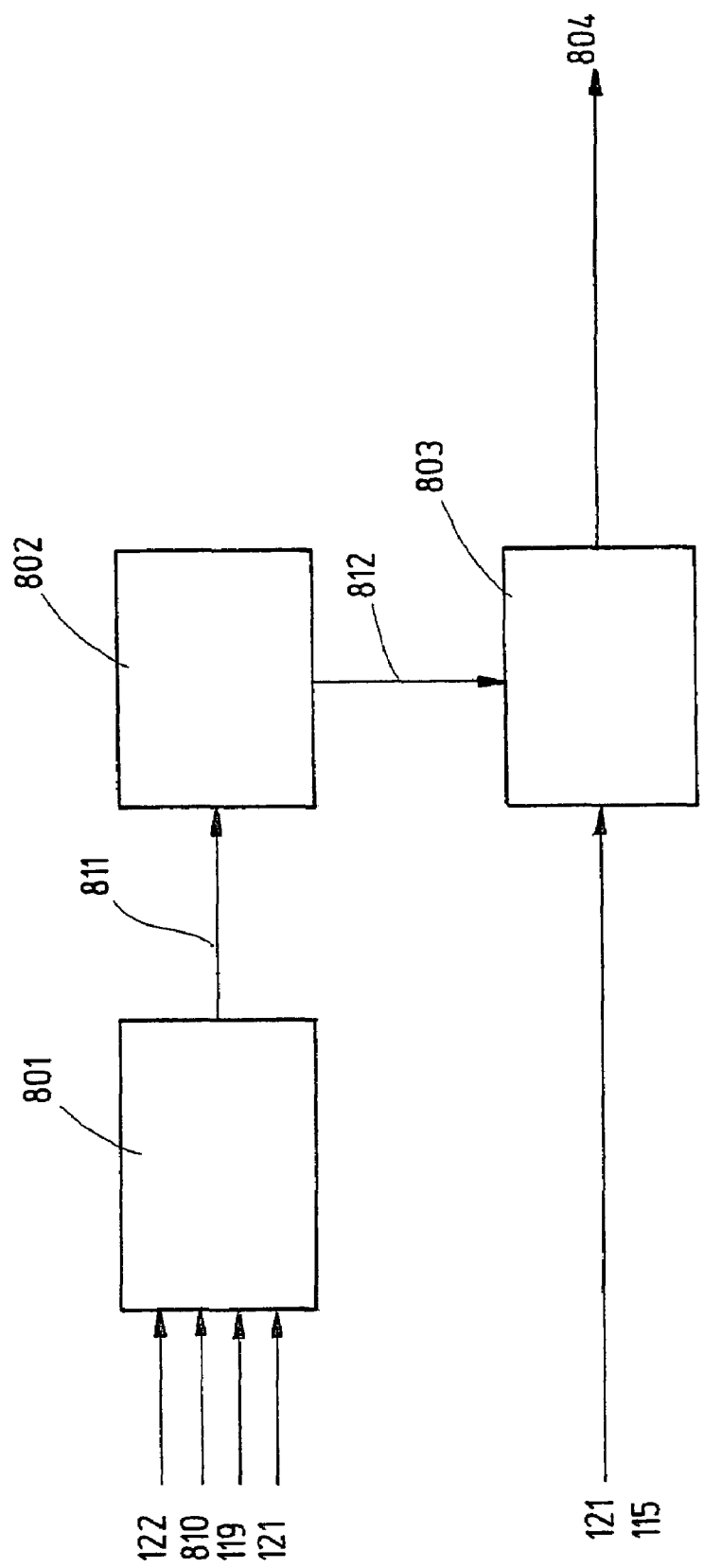
FIG. 10 shows a block diagram for explaining the determination of reference rpm signals.

FIG. 10 shows a block diagram for explaining the determination of the reference rpm signals. In block 803, a filter algorithm is provided which filters the output rpm signal 121 or the secondary rpm signal 115. The filter algorithm supplies the reference output rpm or reference secondary rpm 804. The filter parameters 812 of the block 803 are inputted by the block 802. The filter parameters 812 are different for increasing or falling rpms 121. Parameters can, for example, be filter time constants and minimum and maximum gradients. The block 801 supplies an acceleration index 811 which indicates whether the vehicle accelerates or decelerates. This acceleration index operates on the selection of the filter parameters.

The acceleration index 811 is determined by evaluating signals of the engine control and additional signals. These include: the engine rpm 122; the engine torque 810, which is determined by the engine control; the brake signal 119; and, the instantaneous output rpm or vehicle speed 121.

Figure 11:
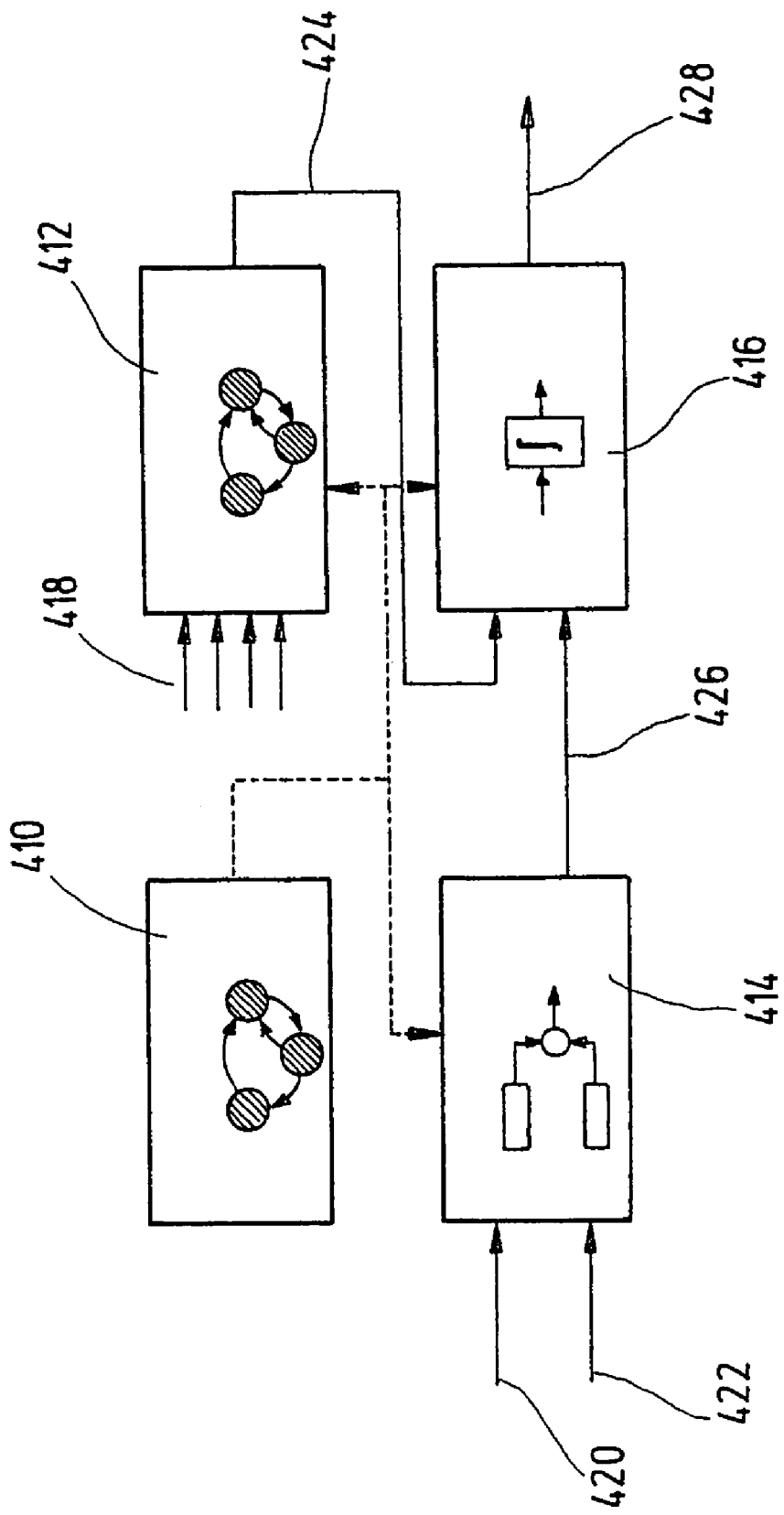
FIG. 11 shows a block diagram for explaining the determination of a reference speed.

FIG. 11 shows a block diagram for explaining the determination of the reference speed. Block 410 functions to recognize the driving situation. This is transmitted to a block 412 for determining a reference rpm, a block 414 with a vehicle model and an observer block 416. Furthermore, wheel rpms 418 are inputted to the block 412 for determining a reference rpm. The vehicle model contains, as further inputs, the accelerator force torque and brake wheel torque 420 as well as the free total running resistance 422. The reference rpm 424 as output value of the block 412 is inputted to the observer block 416 in addition to the acceleration 426 which is estimated by the vehicle model 414. The result of the observer block 416 is the reference speed 428.

In this way, the reference output rpm 804 ($N_{ab,ref}$) can be determined from the reference speed ($v_{Fzg}$) via multiplication by a factor:

$$N_{ab,ref} = k_{ab,vfz} * v_{Fzg} \quad (4)$$

The method comprises the following component functions:

recognition of a driving situation;

forming a reference wheel rpm;

computing an estimated acceleration;

observation algorithm for determining the reference speed.

Figure 12:
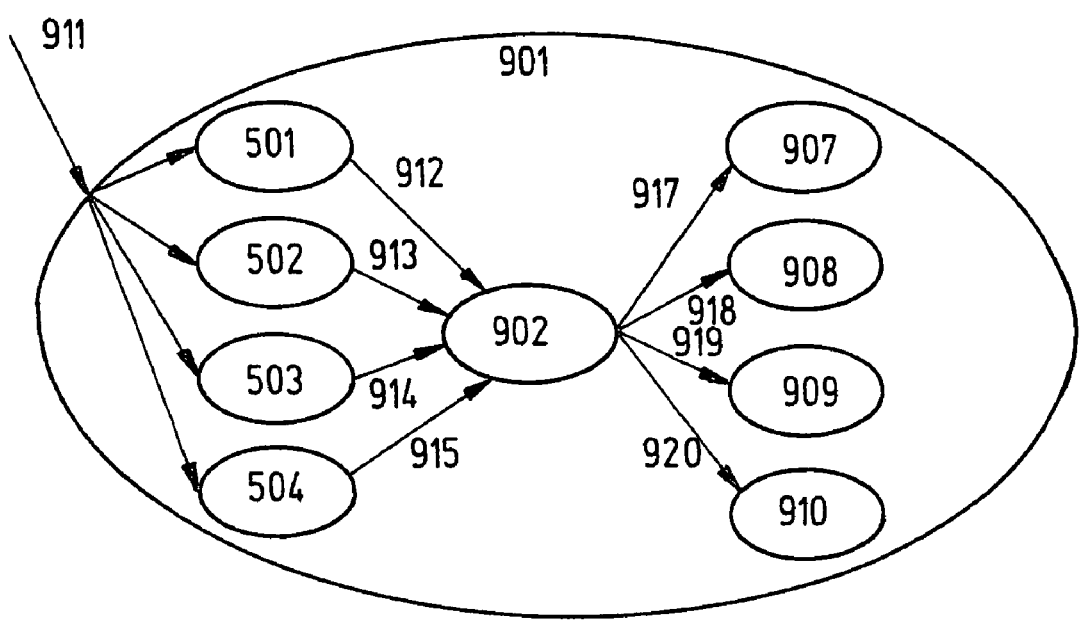
FIG. 12 shows a schematic representation of an object-orientated control structure corresponding to the block diagram shown in FIG. 7.

FIG. 12 shows a schematic illustration of an object-orientated control structure corresponding to the block diagram shown in FIG. 7. The object-orientated control structure 901 is a realization of a desired ratio determination.

The inquiry 911 symbolizes the request to compute a desired ratio on the basis of the relative driver accelerative force command.

The administrator object 902 is at the center point of the control structure 901. The administrator object 902 executes the interrogation of the supplier objects 907 to 910. The supplier objects make available component functionalities of the control structure and are generally specialized as to specific driving situations. The supplier objects can feed back specific information to the administrator object when the administrator object interrogates the supplier objects with the inquiries 917 to 920.

The object 501 for determining the steady-state desired rpm inquires of the administrator object 902 as to a steady-state desired rpm 511. The administrator object 902 can now interrogate the supplier objects 907 to 910 with an adjustable priority as to whether they want to present a suggestion for a steady-state desired rpm. The highest priority suggestion wins and is fed back by the administrator object to the calling object 501.

In the same manner as above, the object 502 presents an inquiry 913 for information for influencing the dynamic behavior of the desired rpm to the administrator object 902. This information can, for example, be filter parameters and maximum or minimum rpm gradients.

In the same manner as above, the object 503 makes an inquiry 914 to the administrator object 902 as to a ratio suggestion and limiting information. The limiting information indicates how the ratio suggestion should be computed with the ratio derived from the desired rpm.

The limiting indicates whether:

the ratio suggestion should not be considered;

the ratio suggestion alone inputs the steady-state desired ratio;

the ratio suggestion defines a lower limit or upper limit for the ratio which is derived from the desired rpm;

the ratio suggestion defines a shift limit for the ratio derived from the desired rpm.

In the same manner as above, the object 504 presents an inquiry 915 as to information for influencing the dynamic behavior of the desired ratio to the administrator object 902. This information can, for example, be filter parameters and maximum or minimum ratio gradients.

Figure 13:
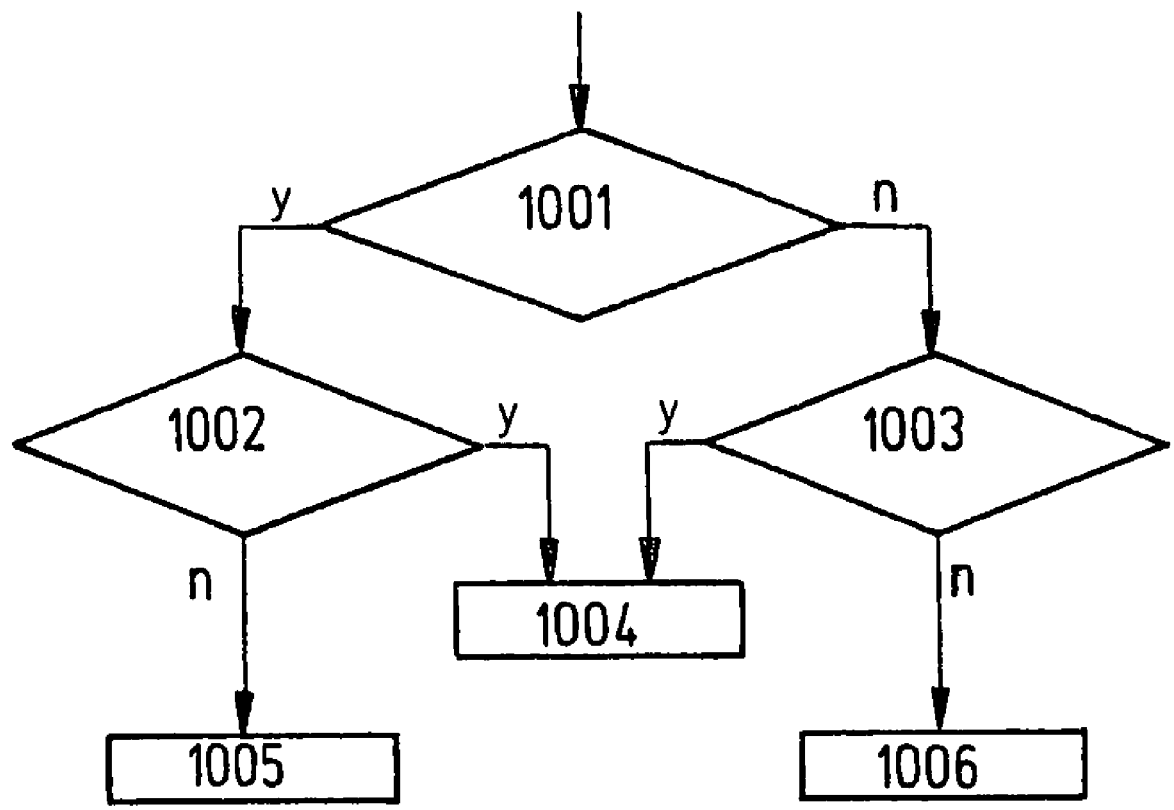
FIG. 13 shows a flow diagram for explaining a limiting information interrogation or inquiry; and, FIG. 14 shows a flowchart for explaining a further limiting information inquiry.

FIG. 13 shows a flowchart for explaining a limiting information interrogation. A limiting is shown which is executed when the limiting information indicates whether the ratio suggestion defines a lower limit or an upper limit for the ratio derived from the desired rpm.

In the interrogation 1001, a test is made as to whether the ratio, which is derived from the desired rpm, is greater than the dynamic desired ratio 206. If this is the case, a test results in the interrogation 1002 as to whether the ratio suggestion is less than the ratio derived from the desired rpm. If so, the ratio suggestion for the steady-state ratio 513 is used (operation 1004). If not, the ratio, which is derived from the desired rpm, is used for the steady-state ratio 513 (operation 1005).

In the event that the interrogation 1001 supplies the result "no", a check is made in the interrogation 1003 as to whether the ratio suggestion is greater than the ratio derived from the desired rpm. If this is the case, then the operation 1004 is carried out (see above). In the event that this is not the case, the operation 1006 is carried out, that is, the ratio, which is derived from the desired rpm, is used for the steady-state ratio 513.

Figure 14:
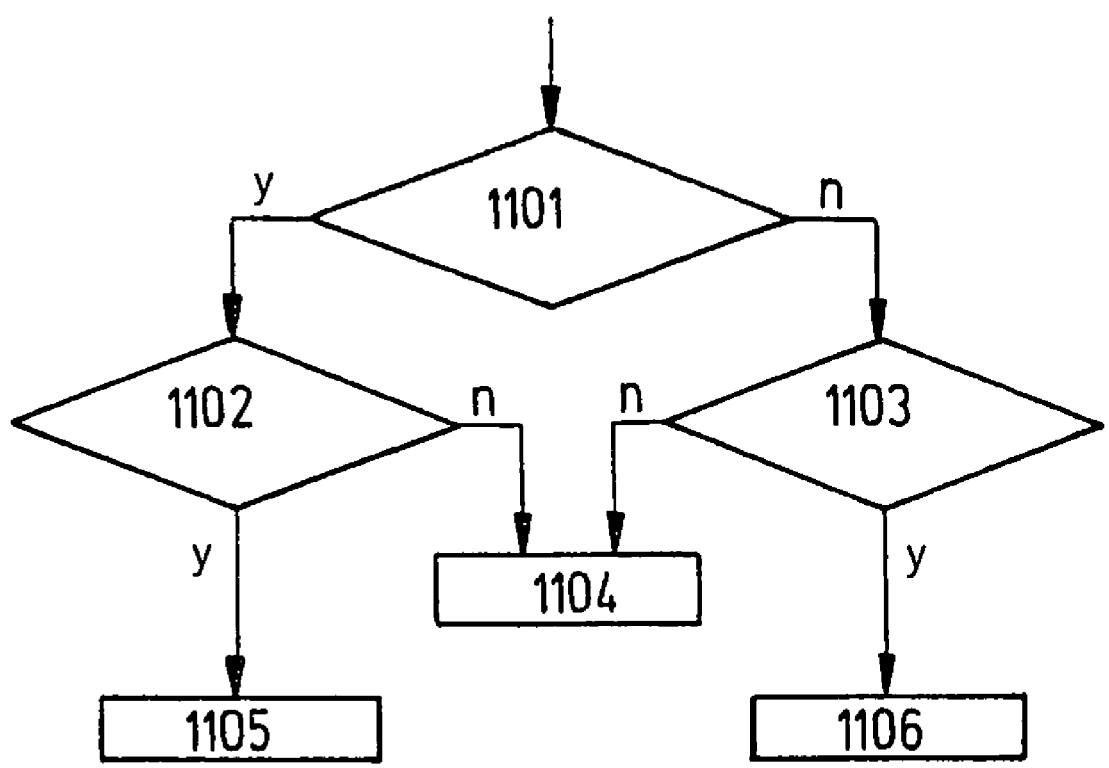

FIG. 14 shows a flowchart for explaining a further limiting information interrogation. The limiting is shown which is carried out when the limiting information indicates whether the ratio suggestion defines a shifting limit for the ratio derived from the desired rpm.

In the interrogation 1101, a test is made as to whether the ratio, which is derived from the desired rpm, is greater than the dynamic desired ratio 206. If this is the case, then a test takes place in the interrogation 1102 as to whether the ratio suggestion is less than the ratio derived from the desired rpm. If so, the operation 1105 is carried out and the result is assigned to the steady-state ratio 206. The operation 1105 forms the maximum of the ratio suggestion and the up-to-now dynamic desired ratio 206. If the interrogation 1102 results in "no", then the ratio, which is derived from the desired rpm, is used for the steady-state ratio 513 (operation 1104).

In the event that the interrogation 1101 supplies the result "no", a check is made in the interrogation 1103 as to whether the ratio suggestion is greater than the ratio derived from the desired rpm. If this is not the case ("no"), then the operation 1104 is carried out (see above). In the event that this is the case ("yes"), the operation 1106 is carried out. The operation 1106 forms the minimum of the ratio suggestion and the up-to-now dynamic desired ratio 206.

The above description of the embodiments according to the invention serves only illustrative purposes and is not for the purpose of limiting the invention. In the context of the invention, various changes and modifications are possible without leaving the extent of the invention as well as its equivalents.

The invention claimed is:

1. A system for inputting a motor torque and a transmission ratio in a vehicle having a continuously adjustable transmission, the system comprising:

means for determining a signal representing a relative driver accelerative force command;

means for determining a desired motor torque while considering said signal representing said relative driver accelerative force command;

means for determining a desired transmission ratio in dependence upon said signal representing said relative driver accelerative force command;

several characteristic fields being provided for determining the relative driver accelerative force command; and, the characteristic fields being usable in dependence upon a selection lever position.

2. A system for inputting a motor torque and a transmission ratio in a vehicle having a continuously adjustable transmission, the system comprising:

means for determining a signal representing a relative driver accelerative force command;

means for determining a desired motor torque while considering said signal representing said relative driver accelerative force command;

means for determining a desired transmission ratio in dependence upon said signal representing said relative driver accelerative force command;

several computation methods being provided for determining the relative driver accelerative force command; and, the computation methods being usable in dependence upon a selection lever position.

3. A system for inputting a motor torque and a transmission ratio in a vehicle having a continuously adjustable transmission, the system comprising:

means for determining a signal representing a relative driver accelerative force command;

means for determining a desired motor torque while considering said signal representing said relative driver accelerative force command;

means for determining a desired transmission ratio in dependence upon said signal representing said relative driver accelerative force command; and, the transmission ratio being maintained when switching over from an automatic operation into a manual operation.

4. A system for inputting a motor torque and a transmission ratio in a vehicle having a continuously adjustable transmission, the system comprising:

means for determining a signal representing a relative driver accelerative force command;

means for determining a desired motor torque while considering said signal representing said relative driver accelerative force command;

means for determining a desired transmission ratio in dependence upon said signal representing said relative driver accelerative force command; and, in a manual operation when reaching an rpm threshold, the desired transmission ratio being changed continuously so that an rpm limit is not exceeded or there is no drop therebelow.

5. A system for inputting a motor torque and a transmission ratio in a vehicle having a continuously adjustable transmission, the system comprising;
- means for determining a signal representing a relative driver accelerative force command;
- means for determining a desired motor torque while considering said signal representing said relative driver accelerative force command;
- means for determining a desired transmission ratio in dependence upon said signal representing said relative driver accelerative force command; and,
- in manual operation, a gear information being adapted to the instantaneously selected transmission ratio.

6. A system for inputting a motor torque and a transmission ratio in a vehicle having a continuously adjustable transmission, the system comprising;
- means for determining a signal representing a relative driver accelerative force command;
- means for determining a desired motor torque while considering said signal representing said relative driver accelerative force command;
- means for determining a desired transmission ratio in dependence upon said signal representing said relative driver accelerative force command; and,
- the determination of the desired transmission ratio including at least an administrator object and several supplier objects in the sense of an object-orientated structure.

7. The system of claim 6, wherein the administrator object interrogates the supplier objects as to whether they want to supply information for determining the desired transmission ratio.

8. The system of claim 6, wherein the interrogation of the supplier objects takes place in a prioritized manner.

9. The system of claim 6, wherein the supplier objects can supply a desired rpm and/or a desired transmission ratio.

10. A method for inputting a motor torque and a transmission ratio in a vehicle having a continuously variable transmission, the method comprising the steps of;
- determining a signal representing the relative driver accelerative force command;
- determining a desired motor torque while considering the signal representing the relative driver accelerative force command;
- determining a desired transmission ratio in dependence upon the signal representing the relative driver accelerative force command;
- several characteristic fields being provided for determining the relative driver accelerative force command; and,
- the characteristic fields being used in dependence upon a selection lever position.

11. A method for inputting a motor torque and a transmission ratio in a vehicle having a continuously variable transmission, the method comprising the steps of;
- determining a signal representing the relative driver accelerative force command;
- determining a desired motor torque while considering the signal representing the relative driver accelerative force command;
- determining a desired transmission ratio in dependence upon the signal representing the relative driver accelerative force command;
- several computation methods being provided for determining the relative driver accelerative force command; and,
- the computation methods being used in dependence upon a selection lever position.

* * * * *